Oct. 9, 1956 O. NÜBLING 2,765,623
ROTARY PUMP AND MOTOR HYDRAULIC TRANSMISSION
Filed Dec. 16, 1953. 3 Sheets-Sheet 1

INVENTOR.
Otto Nübling
BY Michael S. Striker
agt.

Oct. 9, 1956           O. NÜBLING           2,765,623

ROTARY PUMP AND MOTOR HYDRAULIC TRANSMISSION

Filed Dec. 16, 1953           3 Sheets-Sheet 2

INVENTOR.
Otto Nübling
BY Michael S. Striker
Agt.

INVENTOR.
Otto Nübling

United States Patent Office 2,765,623
Patented Oct. 9, 1956

2,765,623

ROTARY PUMP AND MOTOR HYDRAULIC TRANSMISSION

Otto Nübling, Weener (Ems), Germany, assignor to Firma Theodor Klatte, Bremen-Huchting, Germany Application December 16, 1953, Serial No. 398,575

Claims priority, application Germany December 17, 1952

15 Claims. (Cl. 60—53)

The present invention relates to hydraulic transmissions and more particularly to an arrangement for simultaneously regulating the pump and motor of a hydraulic transmission.

The pump and motor as used in the hydraulic transmission are preferably of the type in which an inner rotary member having teeth on the outer surface thereof is arranged eccentrically with respect to an outer annular member having teeth at the inner surface thereof. The inner member has one tooth less than the outer member and meshes with the same. It is known to supply and discharge operating liquid to and from hydraulic apparatus of this type by means of a tubular control valve turnably mounted in an axial bore of the hydraulic apparatus, and to adjust the effective volume of the hydraulic apparatus, which may be a pump or a motor, by turning the control valve.

It is one object of the present invention to provide a rotary pump and motor hydraulic transmission which operates efficiently and is gradually adjustable between lower and higher driving speeds, a breaking position in which the hydraulic transmission brakes the driven shaft and a reversed position in which the driven shaft is rotated in a reversed direction.

It is another object of the present invention to rotatably mount the outer rotary member of the pump in ring means which are rotatable in a supporting casing, and to connect such ring means to the inner member of the motor which drives the driven shaft.

It is a further object of the present invention to provide a pump control valve which is adjusted to produce maximum pump output capacity in coupled position of the transmission, and a motor control valve gradually adjustable by independent operating means to a position in which the motor cannot receive oil in coupled position of the transmission.

It is a still further object of the present invention to provide a rotary pump and motor hydraulic transmission in which a hydraulic apparatus acting during normal operation as a motor is adjusted to operate as a pump, and the hydraulic apparatus acting during normal operation as a pump is adjusted to operate as a motor in such manner that the driven shaft is operated by the transmission acting as an overdrive.

With these objects in view the present invention mainly consists in a rotary pump and motor hydraulic transmission comprising, in combination, rotary hydraulic pump apparatus and rotary hydraulic motor apparatus, each of the apparatus including rotary outer and inner members having parallel spaced axes of rotation, the rotary outer and inner members of the pump apparatus and of the motor apparatus, respectively, defining working chamber means increasing in volume and discharge chamber means decreasing in volume during rotation, each of the inner members being formed with an axial bore and with radial passages connecting the respective axial bore with the working chamber means of the respective inner member; a pump control valve located in the bore of the inner member of the pump apparatus and being turnable therein for adjusting the amount of operating liquid discharged and received by the pump apparatus, a motor control valve located in the bore of the inner member of the motor apparatus and being turnable therein for adjusting the amount of operating liquid received and discharged by the rotary motor apparatus, the pump control valve and the motor control valve being formed with communicating conduits for conducting operating liquid between the working chambers of the pump apparatus and of the motor apparatus, supporting means rotatably supporting the outer member of the motor means, ring means rotatably mounted in the supporting means, bearing means rotatably supporting the outer member of the pump means in the ring means, means connecting the ring means to the inner member of the motor means for rotation, and a driven shaft connected for rotation to the inner member of the motor means and to the ring means.

According to a preferred embodiment of the present invention a shut-off valve is arranged in the conduit connecting the pump with the motor of the hydraulic transmission so that it is possible to interrupt communication between pump and motor in a direct drive position of the control valves in which the operating liquid circulates within the motor. When the shut-off valve is closed before the motor control valve reaches the position in which all liquid is circulated in the motor, the motor is pumped empty, and all losses caused by idle circulation of the liquid in the motor are prevented. The shut-off valve is operated at will by the operator of the hydraulic transmission.

It is known to regulate the amount of operating fluid circulating in a hydraulic transmission depending on the pressure of the same or by means of centrifugal governor depending on the rotary speed. Such regulating actions can be combined, for instance by controlling the effective capacity of the pump by means of a centrifugal governor, and the effective capacity of the motor by means of a servo motor which, respectively, operate the control valves. According to the present invention such control devices are arranged in the following manner:

In a flange of the driven shaft a gear means is mounted which rotates with the driven shaft and rolls on a gear fixed to the motor control valve and on a gear whose position is adjustable for turning the motor control valve. Consequently, the motor control valve is stationary and turned relative to the casing only for adjustment.

The pump control valve rotates with the driven shaft and is turned relative to the same by operating means which are mounted in a member which rotates with the driven shaft.

The operating means for the pump control valve and the motor control valve are mechanically connected and operated by automatic control means including by a servo motor. The pump control valve is so adjusted that the pump operates during the starting operation at a high liquid pressure and at a low effective output volume. At the same time the motor control valve is adjusted for maximum capacity of the hydraulic motor. The servo motor is operated in a known manner by a slide valve means controlled by a centrifugal governor and by manually adjustable spring means.

According to the present invention means are provided for automatically returning the pump control valve into a position effecting idle circulation in the pump when the machine is at a standstill, or when the prime mover idles, and also when an element of the control means fails. Preferably, these means consist in a spring mechanically returning the piston of the servomotor, which operates the control valves, into an end position producing the desired positions of the control valves.

Preferably, means for reversing the rotation of the motor and of the driven shaft are provided which turn the motor control valve through 180° with respect to the starting position. The means for turning the motor control valve into reversing position are arranged intermediate the motor control valve and the servomotor which effects adustment of the motor control valve. Preferably toggle levers are used which are operated by a foot-pedal. The toggle lever system can also be applied for braking the driven shaft by only partly adjusting the motor control valve into a position corresponding to motor reversal. In order to prevent an excessively high pressure in the conduits of the hydraulic transmission during braking, a safety valve is provided in the pump control valve which opens when a predetermined maximum pressure is reached.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
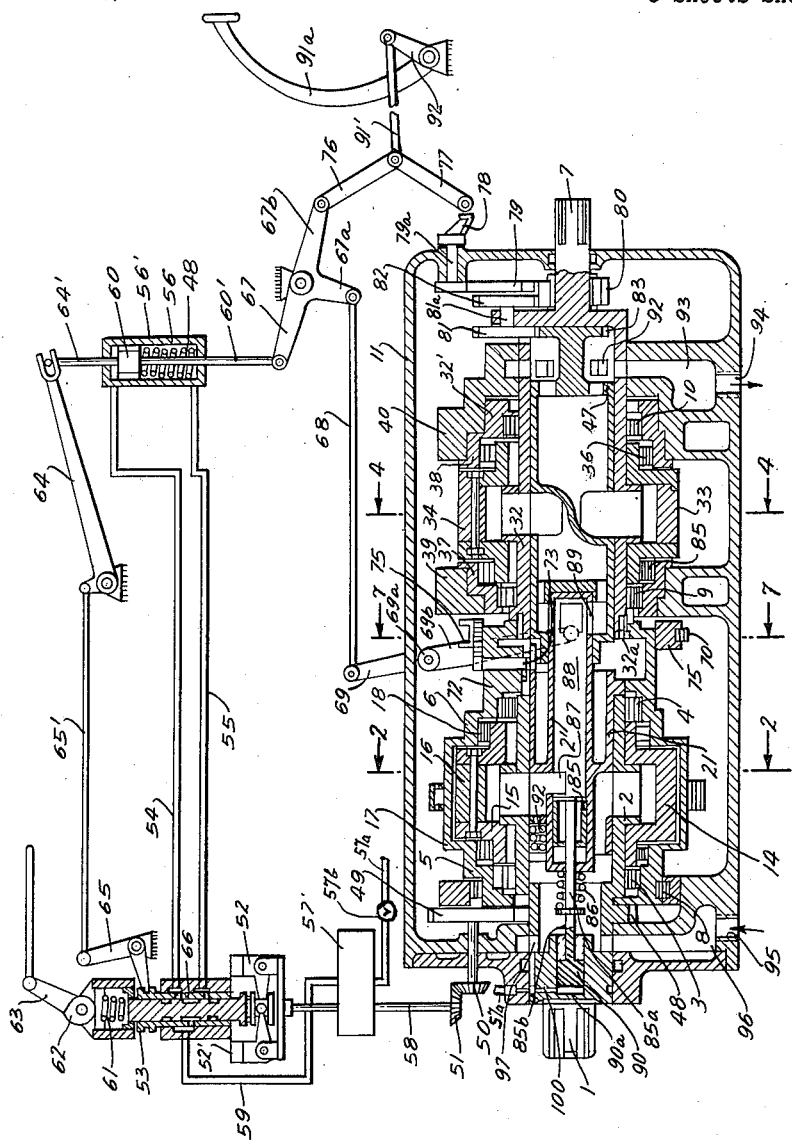
Fig. 1 is a longitudinal section through pump and motor the hydraulic transmission according to the present invention.
Figure 3:
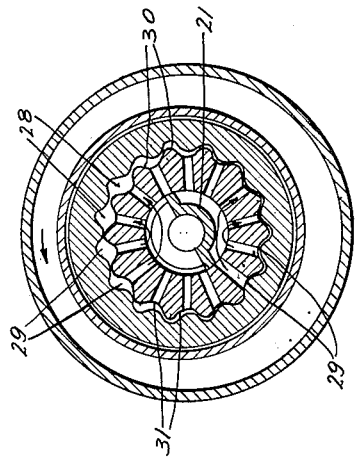
Fig. 3 is a cross section through the pump in starting position on line 2—2 in Fig. 1.
Figure 4:
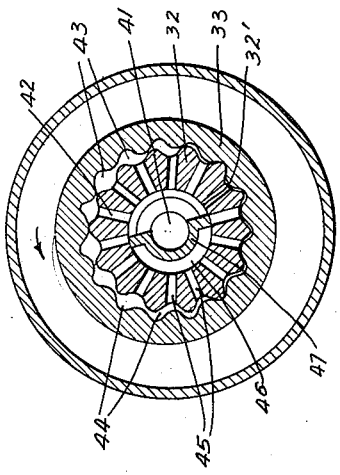
Fig. 4 is a cross section through the motor in starting position on line 4—4 in Fig. 1.

Referring now to the drawings, and more particularly to the lower portion of Fig. 1, the shaft 1 is directly coupled to a prime mover, not shown, such as an internal combustion engine. The shaft 1 is the drive shaft of a pump apparatus which includes an inner rotary member 2 and an outer rotary member 14 whose shape can be best seen from Figs. 2 and 3. The drive shaft 1 is integral with, or fixedly secured to the inner pump member 2, and rotatably mounted in bearings 3 and 4 in the rings 5 and 6, which are connected for rotation to each other, and to the driven shaft 7. The inner member 2 is provided on its outer surface with teeth or projections 12 which mesh with inner teeth or projections 13 of the outer annular member 14. The outer annular member 14 has an axis of rotation which is parallel to the axis of the inner member 2, and defines with the inner member 2 liquid receiving spaces 24, and liquid discharging chambers 26 which are located on opposite sides of a plane of symmetry passing through the axes of the two rotary pump members. These pump working chambers are closed by cheek plates 15 and 16 which are fixedly secured by bolt and nut means to the outer annular member 14 and engage the inner member 2. The outer member 14 is rotatably mounted in the rings 5 and 6 by means of bearings 17 and 18 eccentric to the axis of the drive shaft 7. The motor of the hydraulic transmission is of the same type, and includes as best seen in Fig. 4, an inner rotary motor member 32 and an outer annular motor member 33. Cheek plates 34 are fixedly secured to the outer member 33, and close the suction and pressure chambers 43 and 44. The cheek plates 34 are rotatably mounted in rings 37 and 38, which, in contrast to the pump construction, are fixedly secured to the casing 11 by means of supports 39 and 40. The inner rotary motor member 32 is secured to the ring means 5, 6 by screws 32a and preferably integral with the driven shaft 7.

Pump 2, 14, and motor 32, 33 are both provided with cylindrical bores whose axes coincide with the axis of the inner members 2 and 32. The axial bore 2' of the inner member 2 is connected to the working chambers 24, 26 by radial passages 19, 20, while the corresponding bore 32' in the motor is connected to working chambers 43, 44 by passages 42, 45.

Figure 2:
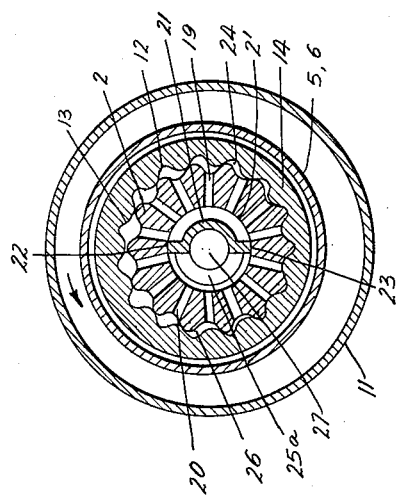
Fig. 2 is a cross section through the pump in a coupled position on line 2—2 in Fig. 1.

The pump and the motor are each provided in a known manner with turnable tubular control valves. The pump control valve 21 has partitioning walls 22, 23 which have free edges sliding during turning of the control valve over the inner surface of the axial bore 2'. In the position of Fig. 2 all working chambers on the right side of the plane of symmetry passing through the axes of the outer and inner members increase in volume, and the working chambers on the left side decrease in volume during rotation in the direction of the arrow so that liquid is pressed through the passages 20 into the liquid discharging space 25a, and is sucked through passages 19 into the liquid receiving spaces 25 of the tubular control valve 21. For starting the transmission, the tubular pump control valve 21 is turned into the position shown in Fig. 3 in which the partitioning walls 22, 23 are in a position transverse to the plane of symmetry passing through the axes of rotation of the two pump members 2, 14 so that the working chambers 28 increasing in volume are connected through the spaces in the tubular control valve 21 with working chambers 29 decreasing in volume so that only a small amount of liquid is pumped by the still operative working chambers 30 and 31. Consequently, the pumped liquid volume is smaller in the position of Fig. 3 than in the position of Fig. 2, and since the driving torque of the prime mover remains the same, the oil pressure is increased for the starting operation.

The liquid discharging space 25a of the pump control valve is a portion of the conduit 83 in the pump control valve 21 which communicates through apertures 89 with the interior of the tubular motor control valve 47. During the starting operation the control valve 47 of the motor is in the position shown in Fig. 4, and the oil passes through the inner conduit 41, and the radial passages 42 into the working chambers 43 which increase in volume during rotation and rotate the motor in the direction of the arrow. Since in the position of the motor control valve shown in Fig. 4 almost all working chambers of the motor are operated, and the pump operates in the position of the pump control valve illustrated in Fig. 3 at very high pressure, a very high torque is produced on the driven shaft 7. The working chambers 44 decrease in volume and press the oil through the passages 45 and the space 46 in the motor control valve from where the oil passes through apertures 92 into a chamber 93 in the casing. The chamber 93 communicates through an outlet 94 and through a conduit including an oil cooler, not shown, with the inlet 95 in the casing, from where the oil passes into chamber 96 and through apertures 97 into the interior of the pump control valve 21 and back to the operative sucking chambers 30 of the pump.

During operation in direct drive the pump control valve 21 is turned into the position shown in Fig. 2 in which all working chambers 24, 26 are fully operative. Simultaneously the motor control valve 47 which is coupled to the pump control valve is turned into the position shown in Fig. 5 in which the oil idly circulates within the motor since the working chambers increasing in volume are directly connected through the interior of the motor control valve 47 with the working chambers decreasing in volume. In this position of the motor control valve no oil can be received or discharged, the pump cannot press the oil into the motor, and the outer pump member 14 and the inner pump member 2 are coupled by the liquid.

Figure 6:
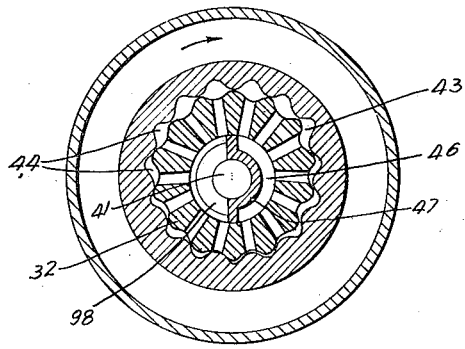
Fig. 6 is a cross section through the motor in reverse position.

Fig. 6 illustrates the position of the motor control valve 47 when the transmission is reversed. The pump control valve 21 may be in the position shown in Fig. 2 or in the position of Fig. 3, according to the position of automatic control means which will be described in greater detail hereinafter. Consequently, more or less liquid will be pumped to the motor whose control valve 47 has been turned into the position shown in Fig. 6 by control means which will be described in greater detail hereinafter. Liquid pressed by the pump and through the interior 41 of the motor control valve enters the working chambers 44 and turns the motor, and thereby the driven shaft means 7, in the direction of the arrow in Fig. 6 which is opposite to the normal direction of rotation.

Figure 5:
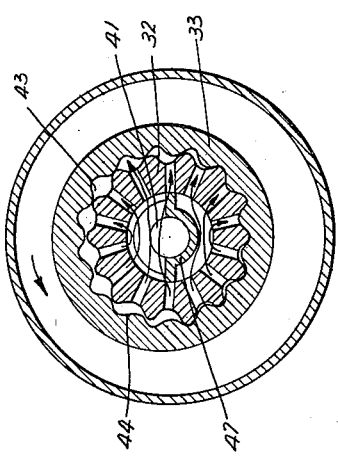
Fig. 5 is a cross section through the motor in direct drive position on line 4—4 in Fig. 1.

When the motor control valve 47 is turned into a position intermediate the positions shown in Figs. 5 and 6, a braking effect is obtained, and the motor operates as a pump and presses oil into the pump 2, 14. During such braking operation an automatic control means, which influences the position of the pump control valve, turns the pump control valve into an idling position in which the working chambers increasing in volume are connected to the working chambers decreasing in volume that is the position in which the partitioning wall 22, 23 extends perpendicular to the plane of symmetry passing through the axes of the outer and inner pump members. This position is not illustrated in the drawing but corresponds to the position of the motor shown in Fig. 5. Since the pump 2, 14 in idling position cannot receive or discharge the operating liquid, the liquid is pressed by the motor operating as pump into the conduit 88 of the pump control valve. A spring loaded safety valve 92 is provided in the pump control valve and opens at a predetermined pressure. The braking action of the hydraulic transmission can be very precisely regulated by turning of the motor control valve 47.

The drive shaft 1 carries a fixed gear 48 which drives a centrifugal governor 52 through gear 49, bevel gears 50 and 51, and a shaft 58. The centrifugal governor 52 operates in a manner, which is known per se, a slide valve 53 which controls the distribution of oil into the conduits 54 and 55 which are connected to the two ends of the cylinder 56' of a servomotor 56 in which a piston 60 is movable. A spring 84 urges the piston 60 into its upper position. The pressure oil for the slide valve 53 is provided through a conduit 59 which is fed by an auxiliary oil pump 57 which is also driven from the shaft 58. A spring 61 urges the control slide valve 53 to move in one direction and into a position in which the conduit 55 communicates with the conduit 59 and oil under pressure enters the lower end of the cylinder 56' of the servomotor 56 and urges the piston 60 to move upwardly. A manually operated lever 63 is provided for adjusting the tension of the spring 61 by means of a cam 62. The centrifugal governor 52 urges the slide valve 53 against the action of spring 61 when the centrifugal weights 52' move outwardly due to an increased rotary speed of the drive shaft 1. When the centrifugal governor rotates at such speed as to overcome the adjustable pressure of the spring 61, the conduit 54 is connected to the pressure conduit 59 and the piston 60 is downwardly urged.

The sleeve 66 which is actuated by the slide valve 53 is connected to the piston 60 by motion transmitting system including bell crank levers 65 and 64 and rods 65' and 64'.

Figure 7:
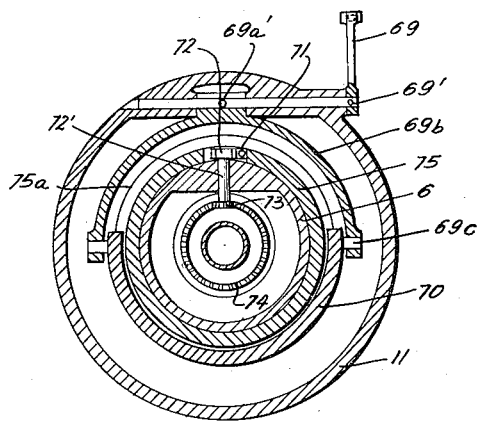
Fig. 7 is a cross section on line 7—7 in Fig. 1 illustrating the means for controlling the position of the pump controlled valve.

The control piston 60 is connected by a rod 60' to a lever 67. Lever 67 has one arm 67a controlling the position of the pump control valve 21, and another arm 67b controlling the position of the motor control valve 47. A rod 68 connects the arm 67a with a lever means 69 which is turnably mounted in the casing 11 on a pin 69a, as best seen in Fig. 7. A fork 69b is fixedly secured by a pin 69a' to the pin 69a. A semi-circular member 70 is connected by pins 69c to the fork 69b and is slidably mounted in an annular groove 75a of an annular member 75 which is fixedly secured to the ring 6, which, as described above, is connected for rotation to the inner member 32 of the motor. A rack bar 71 is fixed to the annular member 75 and meshes with a pinion 72. A bevel gear 73 is connected for rotation with the pinion 72 by a shaft 72' which is turnable in the rotary ring 6. Bevel gear 73 meshes with another bevel gear 74 which is fixedly secured to the pump control valve 21.

When automatic control means and the control plates 60 move, the lever 67 is pivoted which causes pivoting of the lever means 69, 69b, and axial shifting of the members 70, 75 and the rack bar 71 whereby the gears 72, 73 and 74 are turned for turning the pump control valve 21. It will be understood that the lever means 69 and the member 70 are stationary, and that the groove 75a permits rotation of the rotary members 75 and 6.

The lever arm 67b is connected to motion transmitting means including the toggle levers 76 and 77 whose position can be controlled by the rod 91' which is connected to the foot operated lever means 91a, 91. A lever 78 is turned by the toggle lever 77 and effects through a shaft 79a rotation of a toothed segment 79 which meshes with a spur gear 80 rotatable on shaft 7. A pair of gears 81, 82, connected for rotation by a shaft 81a is driven from spur gear 80 and effects rotation of the gear 83 which is fixedly secured to the motor control valve 47. The shaft 81a is turntable in a flange portion of the driven shaft 7 so that the gear 82 rolls on the stationary spur gear 80. The above described arrangement permits a transferring of a control movement through the rotating shaft 7 to the stationary, but turnable motor control valve which is located within the rotating driven shaft 7.

The position of the control piston 60 illustrated in Fig. 1 corresponds to idling of the transmission. The spring 61 is almost completely relieved by manual operation of the member 62 and 63, and the prime mover rotates at low idling speed so that the centrifugal weights 52' are in their innermost position although the tension of the spring 61 is adjusted to be low. The slide valve 53 is in its lower position and moves the control piston 60 to its upper position. In this piston position, the motion transmitting means 67, 68, 69, 70, 75, 71, 72, 73 and 74 effects turning of the pump control valve 21 into an idling position in which the partition wall 22, 23 of the pump control valve extends perpendicular to the position shown in Fig. 2 so that the working chambers increasing in volume are connected to the working chambers decreasing in volume. No liquid is discharged to the motor, which is at a standstill.

The rotary speed of the prime mover is increased for a starting operation until the centrifugal weights 52' move outwardly and the control slide valve 53 is pushed by the centrifugal governor 52 upwardly against the action of the spring 61 so that the conduit 54 is connected with the pressure conduit 59, and the control piston 60 moves downwardly. Such movement of the control piston effects turning of the control valves into the positions shown in Figs. 3 and 4. In accordance with the load on the driven shaft, the motion transmitting system 64, 65 is actuated by the sleeve 66 to push the control piston 60 downward. Automatic regulation takes place at any rotational speed of the prime mover, and the range of rotary speeds within which such regulation is effective can be adjusted at will by tensioning of the spring 61.

In the event that the auxiliary oil pump 57 fails, or when the hydraulic transmission is not operated, the control piston 60 is pressed by a spring 84 into its upper position in which the pump control valve 21 is in idling position and the pump does not press any liquid into the motor.

In the event that the driven shaft 7 runs at the same speed as the drive shaft 1, the motor control valve 47, is in the position interconnecting the working chambers of the motor for idle circulation of the operating liquid, while the pump control valve 21 is in the position in which all working chambers are operating. In this position a great amount of liquid circulates within the motor without producing a torque. It is apparent from Fig. 5 that the oil circulated in the motor requires only little pressure to overcome the flow resistance of the operating liquid in the motor and control valve. In order to eliminate the small losses caused by such idle circulation, according to the present invention means are provided for operating the hydraulic transmission in direct drive while the operating liquid is removed from the motor. A shut-off valve 85 is provided in the interior of the pump control valve 21 which is urged by a spring 86 acting on a flange 85a of a connecting rod 85b to move to the left in Fig. 1 into a position in which the operating liquid can pass from the pump through the slot 87, the conduit 88, the apertures 89 to the motor control valve 47, and to the motor. This position is illustrated in Fig. 1. When a relativie rotation takes place between shaft 1 and shaft 7, the shut off valve 85 is open so that the pump circulates the desired quantity of operating liquid. The oil pressure in the working chambers of the pump produces a torque acting on the bearing rings 5 and 6 since the outer member 14 is eccentrically mounted in the bearing rings. This torque is directly transferred to the driven shaft 7. In addition thereto, the operating liquid discharged by the pump is guided through the pump and motor control valves to the motor which produces in accordance with the control valve position, a variable motor torque acting on the driven shaft. A servo-piston 90 is fixed on the connecting rod 85a and can be operated at will to move the shut-off valve 85 into closing position by pressure oil supplied from the auxiliary pump 57 through a conduit 57a, shown interrupted in Fig. 1 for the sake of clarity, an operating valve 57b, and through the inlet 100 into the cylinder 90a. In direct drive position the operating valve, not shown, is opened so that the servo-piston 90 is moved to the right and moves the shut-off valve 85 into a position closing the slot 87. In this closing position of the shut-off valve 85, the conduit 88 and the interior of the motor control valve are without pressure. If the shut-off valve is operated directly before the motor control valve 47 is turned to the position shown in Fig. 5 in which the motor cannot receive oil from the pump, the rotation of the drive shaft effects emptying of the motor from operating liquid so that all losses due to idle circulation are prevented while the hydraulic transmission is in direct drive position.

The toggle lever system 66, 67 and the operator controlled means 91, 91a are used for braking the driven shaft 7. Before braking by means of the hydraulic transmission is carried out, the prime mover is placed in idling position, for instance by releasing its gas pedal, not shown. Thereby the rotary speed of the drive shaft 1 is reduced. The automatic control means 52, 53, 56 place the pump control valve 21 in idling position in which inner circulation takes place in the pump. The motor control valve 47 is turned beyond the idling position by means of lever 91 and toggle levers 76 and 77, so that the motor operates as a pump and the operating liquid is pumped into the pump proper which is in idling position. The safety valve 92 limits the oil pressure in the pump.

For reversing the direction of rotation of the driven shaft 7, the prime mover is placed in idling position, whereupon the lever 91 is moved by the operator controlled foot-pedal 91a beyond the braking position whereby the motor control valve 47 is turned through 180° as compared with the starting position as shown in Fig. 4 and assumes the position shown in Fig. 6. When the operator increases the rotary speed of the prime mover, the operating liquid effects rotation of the motor in reversed sense. Due to the movement of the driven shaft 7 in reversed direction, the rings 5 and 6 and the drive shaft 1 rotate relative to each other at a higher relative speed whereby an increase of the pumped liquid volume is produced. Since as a rule a lesser speed is required for reversed rotation of the driven shaft, an increase of the relative rotational speed between the rings 5 and 6 and the drive shaft 1 is advantageous. Particularly, when the hydraulic transmission is used for vehicles, slower speed in reverse is desirable.

The hydraulic transmission according to the present invention operates in the following manner:

When the apparatus is started, the driven shaft 7 and the rings 5 and 6 do not rotate at first. The drive shaft 1 is driven by the prime mover and drives the outer member 14 of the pump whereby operating liquid is pressed into the interior of the pump control valve 21 which communicates with the interior of the motor control valve 47. The hydraulic pressure acting on the working chambers of the pump has a resultant force acting on the bearings 17 and 18, and 3 and 4, respectively. The horizontal component of this resultant force acts on the bearings 17 and 18 in a direction perpendicular to a plane passing through the axes of the inner and outer members of the pump. This component consequently produces a torque, since the bearings 17 and 18 are eccentrically mounted in the bearings 3 and 4. Therefore, the input torque acts directly on the driven shaft 7 turning the same in the direction as the motor torque. The hydraulic pressure acting on the pump produces a torque on the rings 5 and 6 through which on the driven shaft 7, which is connected for rotation to the rings 5 and 6, the same torque acts in the same sense of rotation as on the drive shaft 1. The operating liquid is pumped from the pump into the motor and effects a rotation of the outer annular member 33 of the motor in the direction of rotation of the drive shaft 1 and the driven shaft 7 as the bearing rings 37, 38 are fixedly secured to the casing. The motor control valve is in the position of maximum capacity, and the pump control valve is in the position of small capacity, Figs. 3 and 4, and since the effective volume of the working chambers of the motor is greater than the effective volume of the working chambers of the pump, an additional torque produced by the motor acts on the driven shaft 7, such additional torque being much greater than the driving torque. Corresponding to the greater effective volume of the motor, the driven shaft 7 rotates corespondingly slow.

When the driven shaft 7 increases its rotary speed, for instance when the starting inertia of a vehicle is overcome and the vehicle begins to move faster, the prime mover rotates faster and the centrifugal governor 52 turns the pump control valve 21 through the servomotor 56, 60 and the motion transmitting means 68, 69, 72, 73 and 74, and the motor control valve 47 through the motion transmitting means 76, 77, 78, 79, 80, 81, 82 and 83 so that the pump pumps more operating liquid to the motor, while the motor is regulated to a lesser receiving capacity. Consequently, the driven shaft 7 is accelerated until, at a certain ratio between the rotary speeds of the drive shaft 1 and the driven shaft 7, the pumped volume of operating liquid corresponds to the capacity of the motor. When the automatic control means turns the motor control valve 47 into a position in which the motor cannot receive oil and in which all the liquid in the motor is circulated within the same, the motor rotates easily since only little torque is required for circulating the liquid from the liquid discharging working chambers into the liquid receiving working chambers of the motor in which the same liquid pressure is present. The operating liquid pumped by the pump cannot enter the motor, and the inner member 2 and the outer member 14, and the bearing rings 5, 6 of the pump rotate all at the same rotary speed, not considering a small lag caused by the fact that the meshing teeth are not in absolutely liquid-tight engagement. Consequently, the rotary speed and the torques of the drive shaft 1 and the driven shaft 7 are equal.

When the motor control valve is turned beyond the position of Fig. 5, the motor acts as pump and drives the pump 2, 14 to run as a hydraulic motor so that the driven shaft 7 rotates a little faster than the drive shaft 1 producing a corresponding smaller torque which corresponds to an overdrive. In this position a part of the constant driving torque acting on the motor is used for pumping the operating liquid into the pump 2, 14.

In the hydraulic transmission according to the present invention the pump control valve 21 rotates with the driven shaft 7 and is turned for regulation of the pump relative to the driven shaft. The motor control valve is stationary and is only turned for regulating purposes relative to casing.

It will be understood that each of the elements described above, or two or more together, may also find a useful application in other types of pump and motor hydraulic transmission differing from the types described above.

While the invention has been illustrated and described as embodied in a hydaulic transmission comprising a pump and a motor and control valve means for adjusting the effective volume of the working chambers of the pumps and motors, respectively, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a hydraulic transmission, in combination, rotary hydraulic pump apparatus and rotary hydraulic motor apparatus, each of said apparatus including rotary outer and inner members having parallel spaced axes of rotation, the rotary outer and inner members of said pump apparatus and of said motor apparatus, respectively, defining working chamber means increasing in volume and discharge chamber means decreasing in volume during rotation, each of said inner members being formed with an axial bore and with radial passages connecting the respective axial bore with the working chamber means of the respective apparatus; a pump control valve located in said bore of said inner member of said pump apparatus and being turnable therein for adjusting the amount of operating liquid discharged and received by said pump apparatus; a motor control valve located in said bore of said inner member of said motor apparatus and being turnable therein for adjusting the amount of operating liquid received and discharged by said rotary motor apparatus; said pump control valve and said motor control valave being formed with communicating conduits for conducting operating liquid between said working chambers of said pump apparatus and of said motor apparatus; supporting means rotatably supporting said outer member of said motor apparatus; ring means rotatably mounted in said supporting means; bearing means rotatably supporting said outer member of said pump apparatus in said ring means; means connecting said ring means to said inner member of said motor apparatus for rotation therewith; and a driven shaft means connected for rotation to said inner member of said motor apparatus and to said ring means.

2. A hydraulic transmission as claimed in claim 1 and including operating means for turning said pump control valve, said operating means including a gear fixed on said pump control valve, gear means turnably mounted in said ring means and rotating with the same, a rack bar meshing with said gear means, a rotary member fixedly connected with said rack bar and formed with an annular groove, and a stationary operating lever means mounted on said supporting means and having a portion slidably engaging said groove.

3. A hydraulic transmission as claimed in claim 2 comprising automatic control means for actuating said stationary operating lever means, said automatic control means including a servomotor, motion transmitting means connecting said servomotor with said operating lever means, fluid control slide valve means for operating said servomotor, centrifugal governor means connected to said pump apparatus for rotation therewith and connected to actuate said fluid slide valve means, and manually controlled spring means acting on said slide valve means and opposing the action of said centrifugal governor means.

4. A hydraulic transmission as claimed in claim 3 and including operating means for turning said motor control valve, said operating means including a first gear fixed on said motor control valve, a second gear turnably mounted on said driven shaft, a pair of gears mounted on said driven shaft turnable about an axis parallel to the same, said pair of gears meshing with said first gear of said motor control valve and said second gear, and rolling on said first and second gears during rotation of said driven shaft, and adjusting means for turning said second gear on said driven shaft for adjusting the position of said motor control valve.

5. A hydraulic transmission as claimed in claim 4 and including other motion transmission means for connecting said servomotor with said adjusting means for turning said second gear on said driven shaft, said other motion transmitting means including toggle lever means, and manually operated means for actuating said toggle lever means.

6. A hydraulic transmission as claimed in claim 5 wherein said automatic control means control said pump control valve and said motor control valve wherein said other motion transmitting means and said motion transmitting means connecting said servomotor in the said operating lever means are arranged relative to each other and to said servomotor in such manner that one of said control valves adjusts the associated apparatus to maximum capacity when the other of said control valves adjusts the associated apparatus to minimum capacity.

7. A hydraulic transmission as claimed in claim 1 and including a shut-off valve located in said communicating conduit for shutting off communication between said pump apparatus and said motor apparatus in a direct drive position of said control valves.

8. In a hydraulic transmission, in combination, rotary hydraulic pump apparatus and rotary hydraulic motor apparatus, each of said apparatus including rotary outer and inner members having parallel spaced axes of rotation, said rotary outer and inner members of said pump apparatus and of said motor apparatus, respectively, defining working chamber means increasing in volume and discharge chamber means decreasing in volume during rotation, each of said inner member being formed with an axial bore and with passages connecting the respective axial bore with the working chamber means of the respective apparatus; a pump control valve located in said bore of said inner member of said pump apparatus and being turnable therein for adjusting the amount of operating liquid discharged and received by said pump apparatus; a motor control valve located in said bore of said inner member of said motor apparatus and being turnable therein for adjusting the amount of liquid received and discharged by said motor apparatus, said pump control valve and said motor control valve being formed with communicating conduits for conducting operating liquid between said working chambers of said pump apparatus and of said motor apparatus; supporting means rotatably supporting said outer member of said motor apparatus; ring means rotatably mounted in said supporting means; bearing means rotatably supporting said outer member of said pump apparatus in said ring means; means connecting said ring means to said inner member of said motor apparatus for rotation therewith; driven means connected for rotation to said inner member of said motor apparatus and to said ring means; pump operating means for turning said pump control valve; and motor operating means for turning said motor control valve.

9. In a hydraulic transmission, in combination, rotary hydraulic pump apparatus and rotary hydraulic motor apparatus, each of said apparatus including rotary outer and inner members having parallel spaced axes of rotation, said rotary outer and inner member of said pump apparatus and of said motor apparatus, respectively, defining working chamber means increasing in volume and discharge chamber means decreasing in volume during rotation, each of said inner members being formed with an axial bore and with passages connecting the respective axial bore with the working chamber means of the respective apparatus; a pump control valve located in said bore of said inner member of said pump apparatus and being turnable therein for adjusting the amount of operating liquid discharged and received by said pump apparatus; a motor control valve located in said bore of said inner member of said motor apparatus and being turnable therein for adjusting the amount of liquid received and discharged by said motor apparatus, said pump control valve and said motor control valve being formed with communicating conduits for conducting operating liquid between said working chambers of said pump apparatus and of said motor apparatus; supporting means rotatably supporting said outer member of said motor apparatus; ring means rotatably mounted in said supporting means; bearing means rotatably supporting said outer member of said pump apparatus in said ring means; means connecting said ring means to said inner member of said motor apparatus for rotation therewith; driven means connected for rotation to said inner member of said motor apparatus and to said ring means; pump operating means for turning said pump control valve; and automatic control means including a servomotor, motion transmitting means connecting said servomotor with said pump operating means, and centrifugal governor means connected to said pump apparatus for rotation therewith and connected to said servomotor for actuating the same and thereby said pump control valve in accordance with the rotary speed of said pump apparatus.

10. In a hydraulic transmission, in combination, rotary hydraulic pump apparatus and rotary hydraulic motor apparatus, each of said apparatus including rotary outer and inner members having parallel spaced axes of rotation, said rotary outer and inner members of said pump apparatus and of said motor apparatus, respectively, defining working chamber means increasing in volume and discharge chamber means decreasing in volume during rotation, each of said inner members being formed with an axial bore and with passages connecting the respective axial bore with the working chamber means of the respective apparatus; a pump control valve located in said bore of said inner member of said pump apparatus and being turnable therein for adjusting the amount of operating liquid discharged and received by said pump apparatus; a motor control valve located in said bore of said inner member of said motor apparatus and being turnable therein for adjusting the amount of liquid received and discharged by said motor apparatus, said pump control valve and said motor control valve being formed with communicating conduits for conducting operating liquid between said working chambers of said pump apparatus and of said motor apparatus; supporting means rotatably supporting said outer member of said motor apparatus; ring means rotatably mounted in said supporting means; bearing means rotatably supporting said outer member of said pump apparatus in said ring means; means connecting said ring means to said inner member of said motor apparatus for rotation therewith; driven means connected for rotation to said inner member of said motor apparatus and to said ring means; motor operating means for turning said motor control valve; and automatic control means including a servomotor, motion transmitting means connecting said servomotor with said motor operating means, and centrifugal governor means connected to said pump apparatus for rotation therewith and connected to said a servomotor for actuating the same and thereby said motor control valve in accordance with the rotary speed of said pump apparatus.

11. In a hydraulic transmission, in combination, rotary hydraulic pump apparatus and rotary hydraulic motor apparatus, each of said apparatus including rotary outer and inner members having parallel spaced axes of rotation, said rotary outer and inner members of said pump apparatus and of said motor apparatus, respectively, defining working chamber means increasing in volume and discharge chamber means decreasing in volume during rotation, each of said inner members being formed with an axial bore and with passages connecting the respective axial bore with the working chamber means of the respective apparatus; a pump control valve located in said bore of said inner member of said pump apparatus and being turnable therein for adjusting the amount of operating liquid discharged and received by said pump apparatus; a motor control valve located in said bore of said inner member of said motor apparatus and being turnable therein for adjusting the amount of liquid received and discharged by said motor apparatus, said pump control valve and said motor control valve being formed with communicating conduits for conducting operating liquid between said working chambers of said pump apparatus and of said motor apparatus; supporting means rotatably supporting said outer member of said motor apparatus; ring means rotatably mounted in said supporting means; bearing means rotatably supporting said outer member of said pump apparatus in said ring means; means connecting said ring means to said inner member of said motor apparatus for rotation therewith; driven means connected for rotation to said inner member of said motor apparatus and to said ring means; pump operating means for turning said pump control valve; automatic control means including a servomotor, first motion transmitting means connecting said servomotor with said pump operating means, and centrifugal governor means connected to said pump apparatus for rotation therewith and connected to said servomotor for actuating the same and thereby said pump control valve in accordance with the rotary speed of said pump apparatus; motor operating means for turning said motor control valve; and second motion transmitting means connecting said servomotor with said motor operating means.

12. In a hydraulic transmission, in combination, rotary hydraulic pump apparatus and rotary hydraulic motor apparatus, each of said apparatus including rotary outer and inner members having parallel spaced axes of rotation, said rotary outer and inner members of said pump apparatus and of said motor apparatus, respectively, defining working chamber means increasing in volume and discharge chamber means decreasing in volume during rotation, each of said inner members being formed with an axial bore and with passages connecting the respective axial bore with the working chamber means of the respective apparatus; a pump control valve located in said bore of said inner member of said pump apparatus and being turnable therein for adjusting the amount of operating liquid discharged and received by said pump apparatus between a maximum capacity and a minimum capacity; a motor control valve located in said bore of said inner member of said motor apparatus and being turnable therein for adjusting the amount of liquid received and discharged by said motor apparatus between a maximum capacity and a minimum capacity, said pump control valve and said motor control valve being formed with communicating conduits for conducting operating liquid between said working chambers of said pump apparatus and of said motor apparatus; supporting means rotatably supporting said outer member of said motor apparatus; ring means rotatably mounted in said supporting means; bearing means rotatably supporting said outer member of said pump apparatus in said ring means; means connecting said ring means to said inner member of said motor apparatus for rotation therewith; driven means connected for rotation to said inner member of said motor apparatus and to said ring means; pump operating means for turning said pump control valve; automatic control means including a servomotor, first motion transmitting means connecting said servomotor with said pump operating means, and centrifugal governor means connected to said pump apparatus for rotation therewith and connected to said servomotor for actuating the same and thereby said pump control valve in accordance with the rotary speed of said pump apparatus; motor operating means for turning said motor control valve; and second motion transmitting means connecting said servomotor with said motor operating means, said first motion transmitting means and said second motion transmitting means being arranged and positioned relative to each other and to said servomotor in such manner that said pump control valve adjusts said pump apparatus to minimum capacity when said motor control valve adjusts said motor apparatus to maximum capacity.

13. In a hydraulic transmission, in combination, rotary hydraulic pump apparatus and rotary hydraulic motor apparatus, each of said apparatus including rotary outer and inner members having parallel spaced axes of rotation, said rotary outer and inner members of said pump apparatus and of said motor apparatus, respectively, defining working chamber means increasing in volume and discharge chamber means decreasing in volume during rotation, each of said inner members being formed with an axial bore and with passages connecting the respective axial bore with the working chamber means of the respective apparatus; a pump control valve located in said bore of said inner member of said pump apparatus and being turnable therein for adjusting the amount of operating liquid discharged and received by said pump apparatus; a motor control valve located in said bore of said inner member of said motor apparatus and being turnable therein for adjusting the amount of liquid received and discharged by said motor apparatus, said pump control valve and said motor control valve being formed with communicating conduits for conducting operating liquid between said working chambers of said pump apparatus and of said motor apparatus; supporting means rotatably supporting said outer member of said motor apparatus; ring means rotatably mounted in said supporting means; bearing means rotatably supporting said outer member of said pump apparatus in said ring means; means connecting said ring means to said inner member of said motor apparatus for rotation therewith; driven means connected for rotation to said inner member of said motor apparatus and to said ring means; pump operating means for turning said pump control valve; motor operating means for turning said motor control valve; and operator controlled means connected to said motor operating means for turning said motor control valve into said braking and reversing position for braking and reversing said driven means.

14. In a hydraulic transmission, in combination, rotary hydraulic pump apparatus and rotary hydraulic motor apparatus, each of said apparatus including rotary outer and inner members having parallel spaced axes of rotation, said rotary outer and inner members of said pump apparatus and of said motor apparatus, respectively, defining working chamber means increasing in volume and discharge chamber means decreasing in volume during rotation, each of said inner members being formed with an axial bore and with passages connecting the respective axial bore with the working chamber means of the respective apparatus; a pump control valve located in said bore of said inner member of said pump apparatus and being turnable therein for adjusting the amount of operating liquid discharged and received by said pump apparatus; a motor control valve located in said bore of said inner member of said motor apparatus and being turnable therein for adjusting the amount of liquid received and discharged by said motor apparatus, said pump control valve and said motor control valve being formed with communicating conduits for conducting operating liquid between said working chambers of said pump apparatus and of said motor apparatus; supporting means rotatably supporting said outer member of said motor apparatus; ring means rotatably mounted in said supporting means; bearing means rotatably supporting said outer member of said pump apparatus in said ring means; means connecting said ring means to said inner member of said motor apparatus for rotation therewith; driven means connected for rotation to said inner member of said motor apparatus and to said ring means; means connecting said pump control valve with said driven means for rotation therewith, and turnable relative to the same for adjustment; pump operating means for turning said pump control valve; and motor operating means for turning said motor control valve.

15. In a hydraulic transmission, in combination, rotary hydraulic pump apparatus and rotary hydraulic motor apparatus, each of said apparatus including rotary outer and inner members having parallel spaced axes of rotation, said rotary outer and inner members of said pump apparatus and of said motor apparatus, respectively, defining working chamber means increasing in volume and discharge chamber means decreasing in volume during rotation, each of said inner members being formed with an axial bore and with passages connecting the respective axial bore with the working chamber means of the respective apparatus; a pump control valve located in said bore of said inner member of said pump apparatus and being turnable therein for adjusting the amount of operating liquid discharged and received by said pump apparatus; a motor control valve located in said bore of said inner member of said motor apparatus and being turnable therein for adjusting the amount of liquid received and discharged by said motor apparatus, said motor control valve being turnable into a reversing and braking position in which said motor apparatus operates as a pump, said pump control valve and said motor control valve being formed with communicating conduits for conducting operating liquid between said working chambers of said pump apparatus and of said motor apparatus; supporting means rotatably supporting said outer member of said motor apparatus; ring means rotatably mounted in said supporting means; bearing means rotatably supporting said outer member of said pump apparatus in said ring means; means connecting said ring means to said inner member of said motor apparatus for rotation therewith; driven means connected for rotation to said inner member of said motor apparatus and to said ring means; pump operating means for turning said pump control valve; automatic control means including a servomotor, first motion transmitting means connecting said servomotor with said pump operating means, and centrifugal governor means connected to said pump apparatus for rotation therewith and connected to said servomotor for actuating the same and thereby said pump control valve in accordance with the rotary speed of said pump apparatus; motor operating means for turning said motor control valve; second motion transmitting means connecting said servomotor with said motor operating means; and operator controlled means connected to said second motion transmitting means for actuating the same independently of said servomotor for turning said motor control valve into said braking and reversing position for braking and reversing said driven means.

References Cited in the file of this patent

UNITED STATES PATENTS

| 1,682,303 | Möhl | Aug. 28, 1928 |
| 1,998,922 | Chamberlain et al. | Apr. 23, 1935 |
| 2,397,480 | Fullerton | Apr. 2, 1946 |

FOREIGN PATENTS

| 519,686 | Germany | Mar. 3, 1931 |